United States Patent
Booker et al.

(10) Patent No.: US 12,197,474 B2
(45) Date of Patent: Jan. 14, 2025

(54) CONTEXTUALIZATION OF GEOSCIENTIFIC DATA USING GEOLOGICAL AGE FRAMEWORK

(71) Applicant: Landmark Graphics Corporation, Houston, TX (US)

(72) Inventors: Matthew Booker, Abingdon (GB); Gareth Carroll, Abingdon (GB); Georgina Wright, Abingdon (GB)

(73) Assignee: Landmark Graphics Corporation, Houston, TX (US)

( * ) Notice: Subject to any disclaimer, the term of this patent is extended or adjusted under 35 U.S.C. 154(b) by 237 days.

(21) Appl. No.: 17/470,758

(22) Filed: Sep. 9, 2021

(65) Prior Publication Data
US 2023/0076053 A1 Mar. 9, 2023

(51) Int. Cl.
G06F 16/29 (2019.01)
G06F 16/2457 (2019.01)
G06N 3/02 (2006.01)

(52) U.S. Cl.
CPC ........ *G06F 16/29* (2019.01); *G06F 16/24573* (2019.01); *G06F 16/24575* (2019.01); *G06N 3/02* (2013.01)

(58) Field of Classification Search
CPC ............... G06F 16/29; G06F 16/24573; G06F 16/24575; G06N 3/02
See application file for complete search history.

(56) References Cited

U.S. PATENT DOCUMENTS

| | | | |
|---|---|---|---|
| 8,483,852 B2 | 7/2013 | Kurtenbach et al. | |
| 2004/0022127 A1* | 2/2004 | Faichney | G01V 1/282 367/73 |
| 2010/0204972 A1* | 8/2010 | Hsu | E21B 49/006 703/10 |
| 2011/0120702 A1* | 5/2011 | Craig | E21B 43/26 703/2 |
| 2013/0144574 A1* | 6/2013 | Park | G01V 11/00 703/2 |

(Continued)

FOREIGN PATENT DOCUMENTS

| | | |
|---|---|---|
| CN | 111754627 A | 10/2020 |
| EP | 1994481 B1 | 10/2018 |
| WO | 2015177653 A2 | 11/2015 |

*Primary Examiner* — Kuen S Lu
(74) *Attorney, Agent, or Firm* — Michael Jenney; Parker Justiss, P.C.

(57) ABSTRACT

The disclosure presents processes to improve the ability to analyze geological information for an area or region of interest. A user can specify one or more input files, such as from public, private, or proprietary sources. The user can specify a geological or geographic framework to utilize. The process can then perform a matching between the data in the input files and the data in the framework. The matching process can utilize a geological matching using a specified range of depths or a geographical matching followed by the geological matching. Other parameters can be utilized such as a radius to define an area of interest around a central location of interest. Matched data elements can have geological attributes from the geological framework data linked to data elements in the input files. The input files can be downloaded, displayed, printed, or communicated to another computing system or program for further analysis.

22 Claims, 4 Drawing Sheets

(56) References Cited

U.S. PATENT DOCUMENTS

| | | | |
|---|---|---|---|
| 2013/0346042 A1* | 12/2013 | Shen | G01V 3/083 |
| | | | 703/2 |
| 2014/0089036 A1* | 3/2014 | Chidlovskii | G06Q 10/06 |
| | | | 705/7.27 |
| 2015/0094958 A1 | 4/2015 | Al-Dossary et al. | |
| 2015/0120262 A1* | 4/2015 | Dulac | G01V 20/00 |
| | | | 703/6 |
| 2015/0284811 A1* | 10/2015 | Knight | G16B 20/00 |
| | | | 506/8 |
| 2016/0327680 A1* | 11/2016 | Jain | G01V 5/101 |
| 2018/0068037 A1 | 3/2018 | Williams | |
| 2018/0156934 A1 | 6/2018 | Strang | |
| 2021/0026030 A1* | 1/2021 | Dixon | G01V 1/34 |
| 2021/0033748 A1* | 2/2021 | Rowan | G06F 30/28 |
| 2021/0149076 A1* | 5/2021 | Johnson | G01V 20/00 |
| 2021/0270988 A1 | 9/2021 | Wiltshire et al. | |

* cited by examiner

CONTEXTUALIZATION OF GEOSCIENTIFIC DATA USING GEOLOGICAL AGE FRAMEWORK

TECHNICAL FIELD

This application is directed, in general, to analyzing geoscientific data and, more specifically, to using a standardized contextualization of the data.

BACKGROUND

In determining a geological area for further study or analysis, such as for hydrocarbon development, it would be beneficial to be able to utilize various geological data sources to improve the resulting analysis. Conventionally, a geological framework can be utilized, such as one provided by the United States Geological Survey. Users can have other data sources as well. Combining the private or proprietary data with the public data can be difficult.

SUMMARY

In one aspects, a method is disclosed. In one embodiment, the method includes (1) receiving an input file and a geographic framework, where the input file includes data on subterranean formations in a geographic area, (2) receiving zero or more input parameters, (3) matching input file data from the input file to geographic framework data from the geographic framework using an algorithm determined using the input parameters, (4) attributing a geological age to the input file data, and (5) generating results by linking geological attributes from the geographic framework data to the input file data utilizing the geological age.

In a second aspect, a system is disclosed. In one embodiment, the system includes (1) a geological framework, and (2) a geological contextualizer, capable to receive geological framework data from the geological framework, and to receive one or more input files, and zero or more input parameters, to perform a matching process using a geological match or a geographical match between the geological framework data and input file data from the input files utilizing the input parameters, and to generate results including linking geological attributes from the geological framework data to the input file data.

In a third aspect, a computer program product having a series of operating instructions stored on a non-transitory computer-readable medium that directs a data processing apparatus when executed thereby to perform operations to determine results from a matching algorithm. In one embodiment, the computer program product operations include (1) receiving an input file and a geographic framework, where the input file includes data on subterranean formations in a geographic area, (2) receiving one or more input parameters, (3) matching input file data from the input file to geographic framework data from the geographic framework using an algorithm determined using the input parameters, (4) attributing a geological age to the input file data, and (5) generating the results by linking geological attributes from the geographic framework data to the input file data utilizing the geological age.

BRIEF DESCRIPTION

Reference is now made to the following descriptions taken in conjunction with the accompanying drawings, in which.

DETAILED DESCRIPTION

Modeling a geographic region is useful to determine where economically useful material, whether rock, mineral, hydrocarbon, or other types of material, may be located. Subsidence and uplift can occur, and these forces can cause variations in subterranean formations within the geographic region. Aspects of the subterranean formations, for example, the composition, the primary structures, and the internal architecture, can be synthesized into a history of the geographic region. As a result, predictions on where valuable materials, such as hydrocarbons and minerals, are located, can be made using the synthesis of how the geographic region was formed over time.

The unification and integration of disparate geoscientific data, that are used as inputs into the synthesis, is an industry-wide challenge. There are various contextualization approaches in use, i.e., how to categorize, index, or otherwise use the geoscientific data. Datasets derived from multiple sources can lack commonality and therefore can raise issues when attempting to integrate the datasets together, such as for a holistic subterranean formation analysis or a derivation of more informed subterranean formation evaluations.

To enable integration of disparate geoscientific data, the data needs to be contextualized consistently. By applying a standardized geological age framework to disparate datasets, irrespective of its source or data type, relationships can be formulated. A workflow can ingest and process the geoscientific data before applying an age attribute.

In this disclosure, an age attribution framework utilizing a geological framework, such as the principles of sequence stratigraphy, can be used to process the geoscientific data. Geological input data, e.g., geoscientific data, can be processed with two primary attributes: (1) lithostratigraphy and (2) geographic location, e.g., latitude, longitude, and depth. Each subset of geological data can undergo a quality control check. For example, bounds checks can be performed on the input data to ensure location data is proper, such as having a latitude value in the range of $-90°$ to $90°$ or a longitude value in the range of $-180°$ to $180°$. Other quality control checks can include standardizing lithostratigraphy names, such as using proper capitalization, or replacing non supported alphabetic characters (such as removing non-Latin characters for a Latin character implementation). In some aspects, a lithostratigraphic hierarchy, e.g., a formation or a group, can be extracted as a parameter that can be utilized in the matching process.

Translation techniques can be utilized, such as using a machine learning system or a deep learning neural network system, on the subset of geological data to identify geographic and lithostratigraphic matches to a large training dataset, e.g., a geological framework, for example, from the United States Geological Survey, or other sources. The training dataset can be compiled separately, such as from publicly available data, where each subset of geological data is calibrated to a specified geological age framework. As a result, geological input data that is matched to the training dataset can be attributed with a geological age. The age attribution and the use of a consistent geological age framework can improve the consistency of the geological data contextualization, leading to improved data integration.

A training dataset is used for this disclosure, though the size and completeness of the training dataset can directly impact the accuracy and reliability factors of the resulting matching algorithms. As the size of the training dataset decreases, the accuracy of the age attribution process can decrease.

With training data, and a high-resolution geological framework, the data contextualization process can be automated. This process can enable an improved data integration between various datasets, for example, datasets used by different corporations, clients, customers, vendors, or other entities. The processes described herein can be implemented as a standalone product/tool, or form a component of a large tool or system.

In some aspects, user-defined geographical matching can be utilized. The user can configure the items from the geological framework that are utilized in the processing. For example, the user can specify a geo distance parameter, e.g., a distance or a radius, from a specified origin point that limits the geological data used in the analysis to the data subsets that are at or within this specified geo distance. This can allow a return of results that can be more generalized, such as for a geological basin, province, country, or other designated area (geological or geographic area), or can be more precise and localized, such as for a sub-basin, reservoir, field cluster, or other designated area (geological or geographic area).

In some aspects, user-defined text matching can be utilized. A minimum acceptable text similarity, e.g., a match threshold, can be specified. The match threshold can be utilized to compare data in the geological framework to the input file data. The text matching process can utilize one or more of various algorithms to implement fuzzy string matching to find similar text strings. This aspect can provide flexibility with regards to the confidence of matches to the geological framework.

In some aspects, a secondary input file can be uploaded. The secondary input file can be user controlled data, public source data, private data, or other data sources. In some aspects, the secondary input file can define its file schema in such a way as to allow the process to read in the secondary input file. In some aspects, the process can provide the transformation services to transform the secondary input file into a format usable by the remaining process steps. Allowing the input of secondary input files improves the versatility and robustness of the output of the processes.

In some aspects, the results can be displayed in one or more platforms or systems. For example, the results can be displayed on a variety of web portals, such as interactive online geographic information system (GIS) platforms or interactive online analytics dashboards.

In some aspects, the process can provide the ability to output the results to one or more systems. One or more data formats can be supported. The result files can contain one or more sets of data, for example, the original data from one or more of the input files, the key information from the geological framework, the process results, and other input or interim processing data.

In some aspects, a matching or approximate matching can be processed using geographical locations from the input file or secondary input file to the geographical locations within the geological framework. In this aspect, geological location matching can have a higher precedence than matching on geological attributes or geological formation names. After geographical location matching is completed, the geological attributes from the geological framework can be utilized in the remaining processing analysis.

Figure 1:
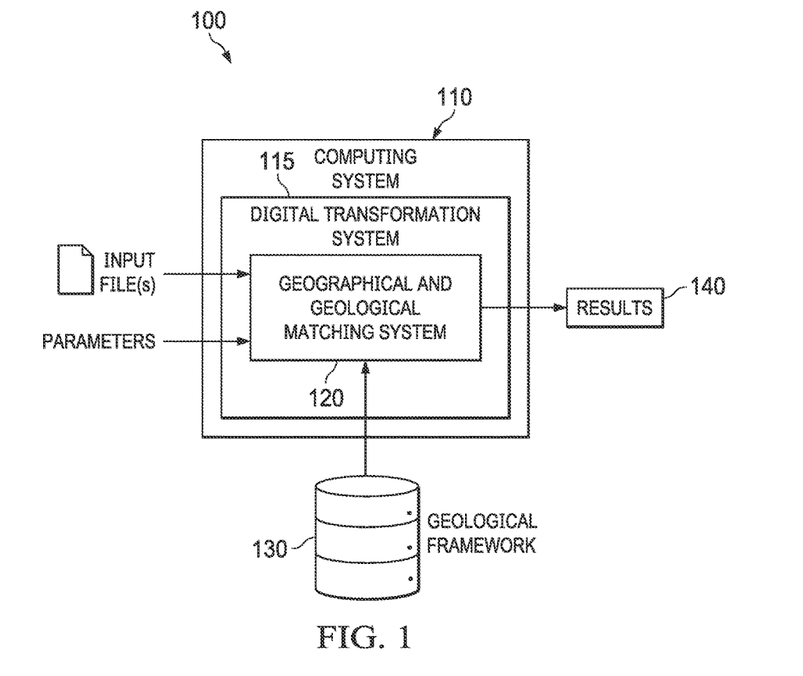
FIG. 1 is an illustration of a functional diagram of an example geological computing system.

Turning now to the figures, FIG. 1 is an illustration of a functional diagram of an example geological computing system 100. Geological computing system 100 is a demonstration of a functional view of a system capable of implementing the disclosed processes, such as shown in method 300 of FIG. 3, and can be implemented using geological contextualization system 400 of FIG. 4, or geological contextualization controller 500 of FIG. 5.

Geological computing system 100 has a computing system 110, a digital transformation system 115, and a geographical and geological matching system 120. Geological computing system 100 can be incorporated into one or more computing systems, such as a laptop, smartphone, personal digital assistant (PDA), server, data center, cloud environment, or other types of computing system, whether centralized, distributed, or edge computing. Computing system 110, digital transformation system 115, or geographical and geological matching system 120 can be incorporated into the same, separate, or partially the same computing system.

Geological computing system 100 can have one or more input files, for example a database, various types of computing files, or other data stores. The input files can be sourced from a public source, a private source, or a proprietary source. The input files can also include a secondary input file, for example, a corporate data store of proprietary data. For example, the input files can include data gathered from previously drilled boreholes or a reservoir analysis. The operator, e.g., a user, a controller, or a system, of geological computing system 100 can specify one or more parameters to be used in the analysis. For example, the input parameters can include a radius, a match threshold, or other input parameters. Parameters that are not specified can be defaulted to a specified value.

The data contained in the input files can be transformed, if needed, by digital transformation system 115, to be in a format that can be analyzed in conjunction with the geological framework. Geographical and geological matching system 120 can utilize the input files, the parameters, and geological framework 130 to perform an analysis on the input files and generate results. The generated results, combined with input data specifications and interim outputs, can be output as results 140 and communicated to one or more other systems.

Figure 2:
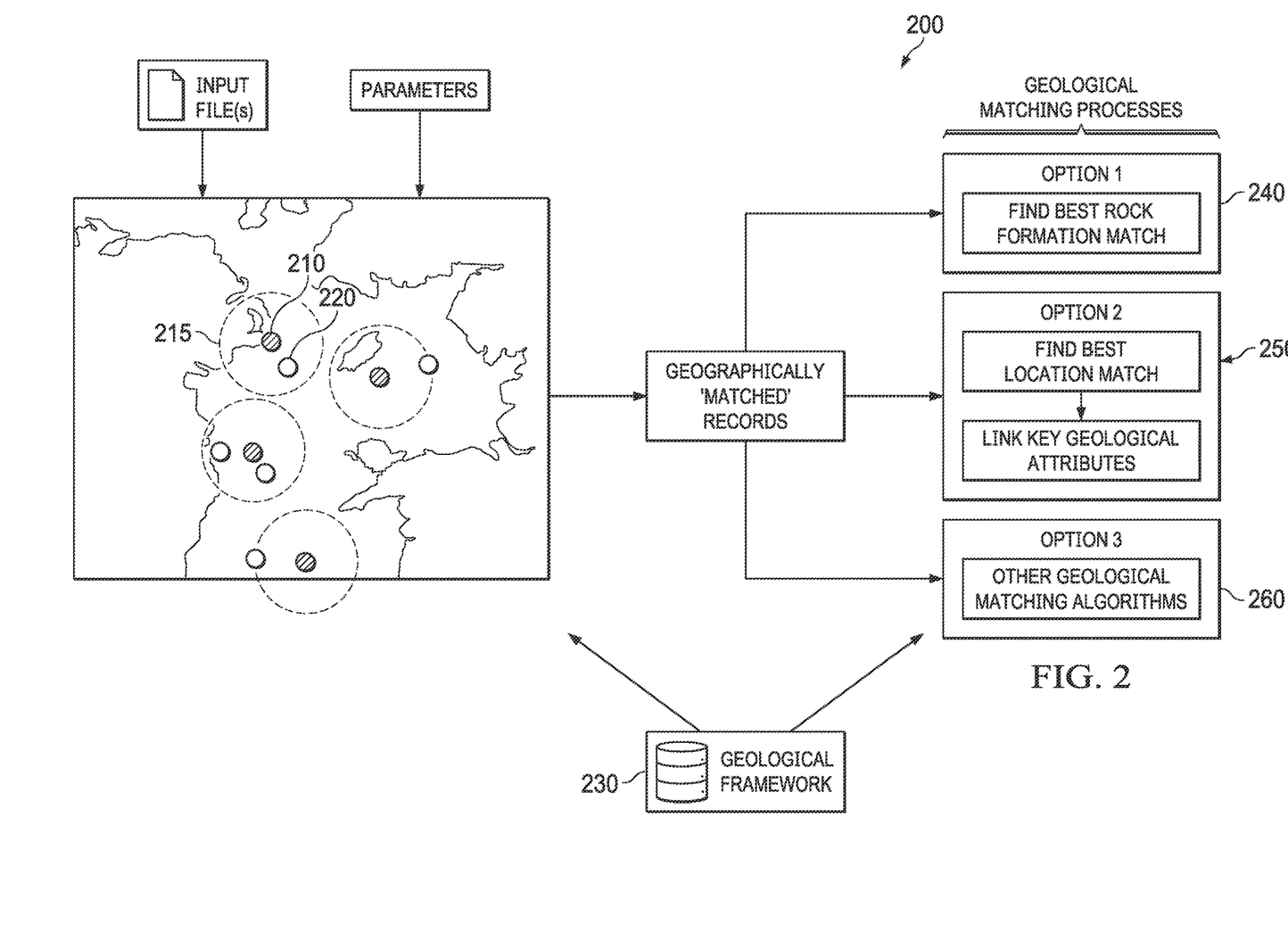
FIG. 2 is an illustration of a functional diagram of an example geographical matching system.

FIG. 2 is an illustration of a functional diagram of an example geographical matching system 200. Geographical matching system 200 is a demonstration of a functional view of a system capable of implementing the disclosed processes, such as shown in method 300 of FIG. 3, and can be implemented using geological contextualization system 400 of FIG. 4, or geological contextualization controller 500 of FIG. 5.

Geographical matching system 200 can be incorporated into one or more computing systems, such as a laptop, smartphone, personal digital assistant (PDA), server, data center, cloud environment, or other types of computing system, whether centralized, distributed, or edge computing. The functions described for Geographical matching system 200 can be incorporated into the same, separate, or partially the same computing system.

Geographical matching system 200 can have one or more input files, such as a database, file, or other data store. The input files can be sourced from a public source, a private source, or a proprietary source. The input files can also include a secondary input file, for example, a corporate data store of proprietary data. The operator, e.g., a user, a controller, or a system, of geographical matching system 200 can specify one or more parameters to be used in the analysis. For example, the parameters can be a geographic region or location of interest, a radius or distance to analyze from the center of the specified location, a range of depths, a match threshold, whether geographical or geological matching takes precedence over the other in the analysis, which input data element takes precedence over a conflicting data element (such as if two input files are used and there is a conflict between data elements between the two files), a geological framework to utilize, or an output system to receive the results, the input data, or the interim outputs. Parameters that are not specified can be defaulted to a specified value.

A geological location, e.g., a geological area or a geographic area, can be specified as shown by an area 210. Area 210 can be of various sizes. A radius parameter can be provided, as shown by radius 215. Radius 215 encompasses an area of interest for the analysis. More than one geographic location can be specified. Geographical matching system 200 can process each geographic location serially, in parallel, overlapping, or various combinations thereof. In some aspects, data, from a geological framework 230, that falls within radius 215 can be selected for further analysis, such as data for subterranean formation 220. There can be zero or more subterranean formations that can be selected for further analysis. In some aspects, a latitude and longitude attribute can be utilized, as well as a depth attribute, to determine a match. In some aspects, other location identification schemes can be utilized.

After there is an approximate geographic match, the process can utilize various options for completing the analysis. For example, an option 240 can be utilized to find the best subterranean formation match, such as using a text string similarity or other matching algorithms. For a second example, an option 250 can be utilized to find the best location match, such as using text string similarity or other matching algorithms. In some aspects, an option 260 can be utilized that uses an alternate geological matching algorithm, such as one used in the industry.

One alternate geological matching algorithm can be that the linking of geological attributes can utilize a second matching of non-geological age attributes (e.g., biostratigraphic zone, deposition facies, or other attributes) to identify geological attributes from the geographic framework data to link to the input file data, where the second matching can utilize the input file data and the geographic framework data. For example, a depositional facies attribute match can be made between a data element in the geological framework and the input file. Once the match is made, the other geological attributes for that data element in the geological framework can be linked to the corresponding data element in the input file. This process can allow the matching to occur using geological names, ages, or other attributes, and the remaining, unmatched attributes can be linked for further analysis of the input file.

Once data elements are determined to match the location, the geological attributes associated with that geological location can be linked to the input file data thereby providing an estimate of the subterranean formation features at the desired geographical location. In some aspects, once option 240, option 250, or option 260 have completed, e.g., a match is made, then the geological ages associated with the 'best match' rock formations can be retrieved from geological framework 230 and linked to the data in the input file.

Figure 3:
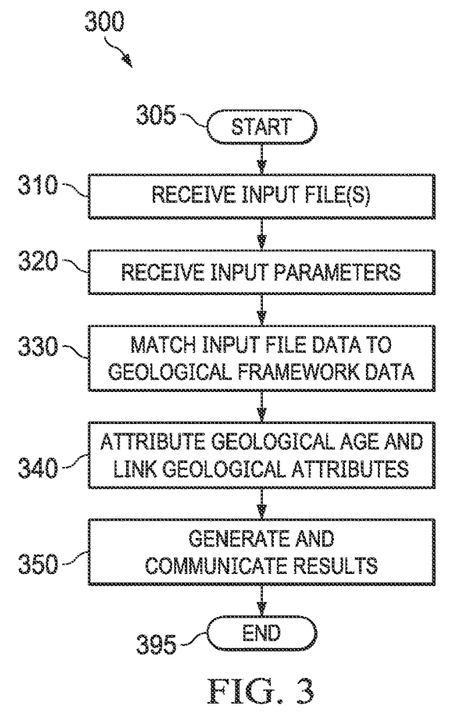
FIG. 3 is an illustration of a flow diagram of an example method to contextualize geological data.

FIG. 3 is an illustration of a flow diagram of an example method 300 to contextualize geological data. Method 300 can be performed, for example, by users performing analysis operations. Method 300 can be performed on a computing system, such as a reservoir controller, data center, cloud environment, server, laptop, mobile device, or other computing system capable of receiving the input files, input parameters, and geological framework, and capable of communicating with other computing systems, for example, geological contextualizer system 400 of FIG. 4 or geological contextualizer controller 500 of FIG. 5. Method 300 can be encapsulated in software code or in hardware, for example, an application, code library, dynamic link library, module, function, RAM, ROM, and other software and hardware implementations. The software can be stored in a file, database, or other computing system storage mechanism. Method 300 can be partially implemented in software and partially in hardware.

Method 300 starts at a step 305 and proceeds to a step 310. In step 310, a user can provide an input file for the process. In some aspects, the data file can undergo quality control checks. The quality control check can authenticate and standardize the constituent data.

In a step 320, the user can provide input parameters to override default parameters defined within the system. One such input parameter can be a geographic search radius, for example, a numerical value in kilometers or miles, within which possible data matches from the geological framework can be matched to the input data. The smaller the search radius, the greater the level of precision on the returned age attributes. Other input parameters can be one or more of a geographic region, a location of interest, a radius of analyzation, a range of depths, a match threshold, an algorithm selection of a geographical matching or a geological matching, a precedence indicator when conflicting data is present, a geological framework to utilize, or an output system to receive the results, the input data, or the interim outputs.

In a step 330, using a computer-assisted translation technique, e.g., fuzzy matching, the lithostratigraphic attributes of each input data element can be compared to the geological framework for similarly named data entries. The degree of text match can be defined by the user, for example, using the match threshold. The match threshold, in some aspects, can utilize a numerical value, for example, expressed as a percentage. The higher the match threshold, the greater the degree of text match is required by the process.

In a step 340, the results of step 320 and step 330 permit the attribution of a geological age to each input data element. This geological age can be calibrated to a high-resolution framework, such as a sequence stratigraphic framework. Thus the process, can apply a standardized method of contextualization to the disparate datasets, e.g., the input files. Other geological attributes can be linked to the input file data using the matching records from the geological framework data, for example, geological framework 230 of FIG. 2.

In a step 350, the results can be output. In some aspects, the results can be transformed to a data format usable by the user or another computing system. The results can include the input file data with the linked geological attributes, and other interim outputs. The results can be utilized by other analysis systems to further determine a value of the location to the user. Method 300 ends at a step 395.

Figure 4:
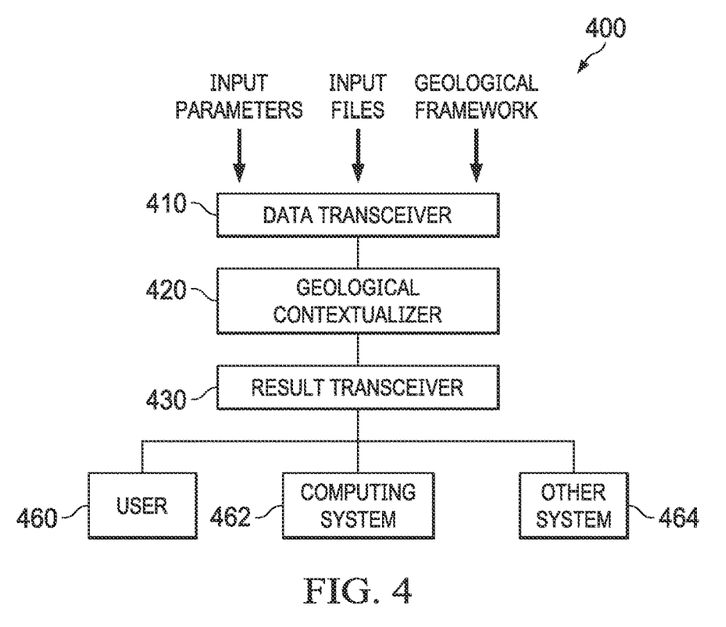
FIG. 4 is an illustration of a block diagram of an example geological contextualization system.

FIG. 4 is an illustration of a block diagram of an example geological contextualization system 400, which can be implemented in one or more computing systems, for example, a data center, cloud environment, server, laptop, smartphone, tablet, and other computing systems. In some aspects, geological contextualization system 400 can be implemented using a geological contextualization controller such as geological contextualization controller 500 of FIG. 5. Geological contextualization system 400 can implement one or more methods of this disclosure, such as method 300 of FIG. 3.

Geological contextualization system 400, or a portion thereof, can be implemented as an application, a code library, dynamic link library, function, module, other software implementation, or combinations thereof. In some aspects, geological contextualization system 400 can be implemented in hardware, such as a ROM, a graphics processing unit, or other hardware implementation. In some aspects, geological contextualization system 400 can be implemented partially as a software application and partially as a hardware implementation. geological contextualization system 400 is a functional view of the disclosed processes and an implementation can combine or separate the described functions in one or more software or hardware systems.

Geological contextualization system 400 includes a data transceiver 410, a geological contextualizer 420, and a result transceiver 430. The generated results and interim outputs from geological contextualizer 420 can be communicated to a data receiver, such as one or more of a user 460, a computing system 462, or other processing or storage systems 464. The generated results can be used to improve decision making on the value of performing drilling operations at or proximate a geological location, geological area, or geographic area.

Data transceiver 410 can receive input parameters, such as parameters to direct the operation of the analysis implemented by geological contextualizer 420. In some aspects, data transceiver 410 can be part of geological contextualizer 420.

Result transceiver 430 can communicate one or more generated results, interim outputs, or data from the input files, to one or more data receivers, such as user 460, computing system 462, storage system 464, or other reservoir related systems. Data transceiver 410, geological contextualizer 420, and result transceiver 430 can be, or can include, conventional interfaces configured for transmitting and receiving data.

Geological contextualizer 420 can implement the analysis and algorithms as described herein utilizing the input files, the geological framework, and the input parameters. For example, geological contextualizer 420 can perform a geological matching process which will link the geological attributes, or a geological location matching process followed by a geological attribute linking process. Geological contextualizer 420 can use one or more algorithms, such as machine learning, decision tree, random forest, logistic regression, linear, and other algorithms to determine the matching between the data in the input files to the geological framework data.

A memory or data storage of geological contextualizer 420 can be configured to store the processes and algorithms for directing the operation of geological contextualizer 420. Geological contextualizer 420 can also include a processor that is configured to operate according to the analysis operations and algorithms disclosed herein, and an interface to communicate (transmit and receive) data.

Figure 5:
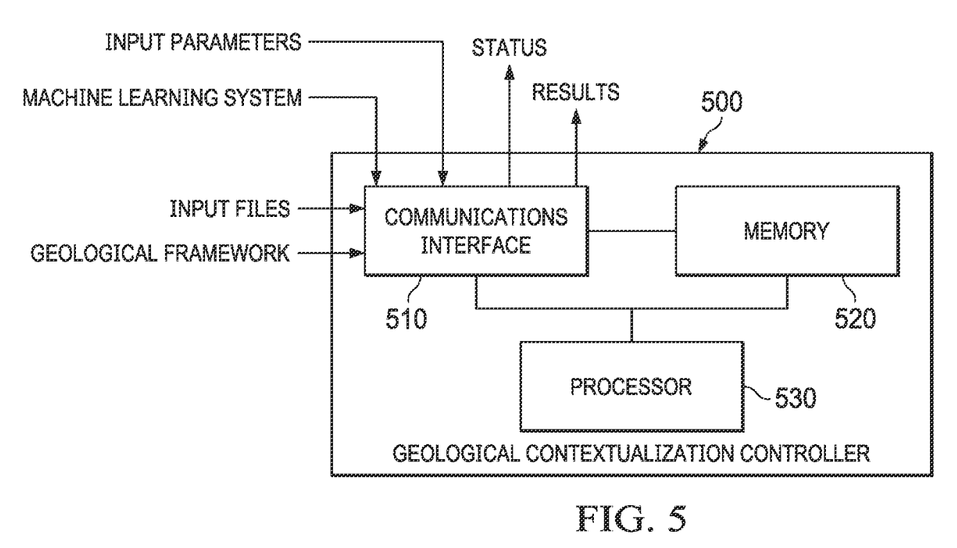
FIG. 5 is an illustration of a block diagram of an example of a geological contextualization controller according to the principles of the disclosure.

FIG. 5 is an illustration of a block diagram of an example of geological contextualization controller 500 according to the principles of the disclosure. Geological contextualization controller 500 can be stored on a single computer or on multiple computers. The various components of geological contextualization controller 500 can communicate via wireless or wired conventional connections. A portion or a whole of geological contextualization controller 500 can be located at one or more locations and other portions of geological contextualization controller 500 can be located on a computing device or devices located. In some aspects, geological contextualization controller 500 can be wholly located at a surface or distant location. In some aspects, geological contextualization controller 500 can be part of another system, and can be integrated in a single device.

Geological contextualization controller 500 can be configured to perform the various functions disclosed herein including receiving input parameters and generating results from an execution of the methods and processes described herein. Geological contextualization controller 500 includes a communications interface 510, a memory 520, and a processor 530.

Communications interface 510 is configured to transmit and receive data. For example, communications interface 510 can receive the input parameters, the input files, and the geological framework data. Communications interface 510 can transmit the generated results, data from the input files, or interim outputs. In some aspects, communications interface 510 can transmit a status, such as a success or failure indicator of geological contextualization controller 500 regarding receiving the various inputs, transmitting the generated results, or producing the generated results, including the matching process utilized and interim outputs. In some aspects, communications interface 510 can receive input parameters from a machine learning system, such as when the matching process is conducted by a machine learning algorithm prior to linking the geological attributes to the input file data. In some aspects, the machine learning system can be implemented by processor 530 and perform the operations as described by geological contextualizer 420 of FIG. 4. Communications interface 510 can communicate via communication systems used in the industry. For example, wireless or wired protocols can be used. Communication interface 510 is capable of performing the operations as described for data transceiver 410 and result transceiver 430 of FIG. 4.

Memory 520 can be configured to store a series of operating instructions that direct the operation of processor 530 when initiated, including the code representing the algorithms for determining the matching analysis. Memory 520 is a non-transitory computer readable medium. Multiple types of memory can be used for data storage and memory 520 can be distributed.

Processor 530 can be configured to produce the generated results, one or more interim outputs, and statuses utilizing the received inputs. For example, processor 530 can perform an analysis of the data in the input files, match geological locations and subterranean formations, and link geological attributes to the data from the input files. Processor 530 can be configured to direct the operation of the geological contextualization controller 500. Processor 530 includes the logic to communicate with communications interface 510 and memory 520, and perform the functions described herein. Processor 530 is capable of performing or directing the operations as described by geological contextualizer 420 of FIG. 4.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY section can have one or more of the following additional elements in combination. Element 1: communicating the results to one or more systems. Element 2: wherein the input parameters are one or more of a geographic region, a location of interest, a radius, a range of depths, a match threshold, an algorithm selection of a geographical matching or a geological matching, a precedence indicator when conflicting data is present, a geological framework to utilize, or an output system to receive the results, the input file data, or interim outputs. Element 3: wherein the matching utilizes the match threshold to determine the geographic framework data to utilize. Element 4: wherein the matching utilizes the radius to determine an area of interest. Element 5: wherein the matching utilizes a geological matching algorithm. Element 6: wherein the matching utilizes a geographical location matching algorithm. Element 7: wherein the linking geological attributes further utilizes a second matching of a non-geological age attribute to identify geological attributes from the geographic framework data to link to the input file data, wherein the second matching utilizes the input file data and the geographic framework data. Element 8: further comprising a result transceiver, capable of communicating the results and interim outputs to a user, a data store, or a computing system, wherein the result transceiver transforms the results and the interim outputs to a specified data format. Element 9: wherein the input parameters are one or more of a geographic region, a location of interest, a radius of analyzation, a range of depths, a match threshold, an algorithm selection of a geographical matching or a geological matching, a precedence indicator when conflicting data is present, a geological framework to utilize, or an output system to receive the results, the input file data, or interim outputs. Element 10: wherein the geological matching or the geographical matching utilizes the match threshold. Element 11: where the match threshold is part of the input parameters. Element 12: wherein the radius of analyzation is utilized to increase the size of the geographic region or to provide an area of interest centered on the location of interest. Element 13: wherein the geological contextualizer utilizes a text string matching algorithm to perform the geological matching or the geographical matching. Element 14: wherein the geological contextualizer utilizes a machine learning system or a deep learning neural network system to determine the geological matching or the geographical matching. Element 15: wherein the results include the input file data and geological attributes linked to data elements of the input file data. Element 16: wherein the matching utilizes a geological matching algorithm or a geographical location matching algorithm.

What is claimed is:

1. A computer implemented method, comprising:
   receiving an input file and a geological framework, where the input file includes disparate data on subterranean formations in a geographic area;
   transforming at least a portion of the input file data into another format compatible with the geological framework;
   receiving one or more different types of input parameters, wherein the input parameters include a geo distance parameter;
   matching, using one or more algorithms, the input file data, including the transformed input file data, to geological framework data of the geological framework that is at or within the geo distance parameter; and
   synthesizing a formation history for the input file data by attributing a geological age to the input file data identified by the matching.

2. The method as recited in claim 1, further comprising:
   generating results based on the attributing and communicating the results to one or more systems.

3. The method as recited in claim 1, wherein the input parameters further include one or more of a geographic region, a location of interest, a range of depths, a match threshold, an algorithm selection of a geographical matching or a geological matching, a precedence indicator when conflicting data is present, or an output system to receive the results, the input file data, or interim outputs.

4. The method as recited in claim 1, wherein the matching further utilizes a match threshold to determine the geological framework data to utilize.

5. The method as recited in claim 1, wherein the geo distance is a numerical value.

6. The method as recited in claim 1, wherein the one or more algorithms includes a geological matching algorithm.

7. The method as recited in claim 1, wherein the one or more algorithms includes a geographical location matching algorithm.

8. The method as recited in claim 1, wherein the matching further utilizes one or more non-geological age attributes.

9. A system, comprising:
a geological framework; and
a processor, capable of:
receiving geological framework data from the geological framework, input files having disparate data of subterranean formations, and one or more different types of input parameters that include a geo distance parameter,
transforming at least a portion of the input file data into another format compatible with the geological framework;
matching the geological framework data and input file data from the input files, including the transformed input file data, utilizing the geo distance parameter, and attributing a geographically-specific geological age distribution to the input file data identified by the matching.

10. The system as recited in claim 9, further comprising:
a result transceiver, capable of communicating results based on the attributing and interim outputs to a user, a data store, or a computing system, wherein the result transceiver transforms the results and the interim outputs to a specified data format.

11. The system as recited in claim 9, wherein the input parameters further include one or more of a geographic region, a location of interest, a range of depths, a match threshold, an algorithm selection of a geographical matching or a geological matching, or a precedence indicator when conflicting data is present.

12. The system as recited in claim 9, wherein the matching further utilizes a match threshold to determine the geological framework data to utilize.

13. The system as recited in claim 9, wherein the geo distance is utilized to increase a size of a geographic region or to provide an area of interest centered on a location of interest.

14. The system as recited in claim 9, wherein the processor further utilizes a text string matching algorithm to perform the matching.

15. The system as recited in claim 9, wherein the processor utilizes a machine learning system or a deep learning neural network system for the matching.

16. The system as recited in claim 9, wherein the matching further utilizes one or more non-geological age attributes.

17. A computer program product having a series of operating instructions stored on a non-transitory computer-readable medium that directs a data processing apparatus when executed thereby to perform operations for subterranean geological assessment and correlation, the operations comprising:
receiving an input file and a geological framework, where the input file includes disparate data on subterranean formations in a geographic area;
transforming at least a portion of the input file data into another format compatible with the geological framework;
receiving one or more different types of input parameters, wherein the input parameters include a geo distance parameter;
matching the input file data, including the transformed input file data, to the geological framework data that is at or within the geo distance parameter; and
synthesizing a formation history for the input file data by attributing a geological age to the input file data identified by the matching.

18. The computer program product as recited in claim 17, further comprising:
generating results based on the attributing and communicating the results to one or more systems.

19. The computer program product as recited in claim 17, wherein the input parameters further include one or more of a geographic region, a location of interest, a match threshold, or range of depths.

20. The computer program product as recited in claim 17, wherein the matching utilizes the geo distance to determine an area of interest.

21. The computer program product as recited in claim 17, wherein the one or more algorithms includes a geological matching algorithm.

22. The computer program product as recited in claim 17, wherein the matching further utilizes a match threshold to determine the geological framework data to utilize.

* * * * *